United States Patent [19]

Milch

[11] Patent Number: 5,221,848
[45] Date of Patent: Jun. 22, 1993

[54] HIGH DYNAMIC RANGE FILM DIGITIZER AND METHOD OF OPERATING THE SAME

[75] Inventor: James R. Milch, Pittsford, N.Y.

[73] Assignee: Eastman Kodak Company, Rochester, N.Y.

[21] Appl. No.: 876,159

[22] Filed: Apr. 30, 1992

[51] Int. Cl.⁵ .................... G01N 21/86; G06K 9/00
[52] U.S. Cl. ................... 250/559; 250/208.1; 356/444; 382/6
[58] Field of Search .............. 382/6; 356/443, 444; 250/327.02, 208.1, 226, 559; 378/62, 98–99; 358/110, 107

[56] References Cited

U.S. PATENT DOCUMENTS

| | | | |
|---|---|---|---|
| 4,479,062 | 10/1984 | Kawasaki et al. | 250/578 |
| 4,652,735 | 3/1987 | Ishikawa et al. | 250/208.1 |
| 4,847,489 | 7/1989 | Dietrich | 250/208.1 |
| 4,884,200 | 11/1989 | Kimura et al. | 382/6 |
| 4,893,345 | 1/1990 | Matsumoto | 382/1 |
| 4,912,558 | 3/1990 | Easterly et al. | 358/213.16 |
| 4,963,739 | 10/1990 | Hishinuma | 250/327.2 |
| 5,034,825 | 7/1991 | Ejiri et al. | 358/475 |
| 5,038,225 | 8/1991 | Maeshima | 358/461 |
| 5,055,667 | 10/1991 | Sayag | 250/208.1 |
| 5,060,081 | 10/1991 | Shimura | 250/327.2 |
| 5,067,163 | 11/1991 | Adachi | 382/6 |
| 5,151,588 | 9/1992 | Kiri et al. | 250/208.1 |

FOREIGN PATENT DOCUMENTS

0052235  3/1984  Japan ........................ 356/444

OTHER PUBLICATIONS

Article by R. M. Rangayyan et al, entitled "Expanding the Dynamic Range of X-Ray Videodensitometry Using Ordinary Image Digitizing Devices" published in Applied Optics, vol. 23, No. 8, Sep. 84, pp. 3117–3120.

Primary Examiner—David C. Nelms
Assistant Examiner—Michael Messinger
Attorney, Agent, or Firm—David M. Woods

[57] ABSTRACT

Apparatus and a method for digitizing an image having a high dynamic range is disclosed. The apparatus includes a solid-state image sensor having at least two linear charge-coupled device arrays thereon. Means is provided to pass the image across the image sensor to be sensed by all of the arrays in a single pass. A light source is provided to direct light from the image onto the arrays. The arrays are provided with means to adjust the arrays so that at least one array is sensitive to low optical densities and at least one array is sensitive to high optical densities. The output signals from the arrays are feed to analog-to-digital converters to convert the signals therefrom to digital form. The digital signals are fed to a computer which combines the signals into a single signal corresponding to the image.

22 Claims, 1 Drawing Sheet

HIGH DYNAMIC RANGE FILM DIGITIZER AND METHOD OF OPERATING THE SAME

FIELD OF THE INVENTION

The present invention relates to a film digitizer and method of operating the same, and, more particularly, to a film digitizer using a solid state imager which provides for a high dynamic range.

BACKGROUND OF THE INVENTION

It has been found desirable to convert the information in a film, such as an x-ray film, to an electrical signal to allow the information to be stored in a computer. For this purpose, systems have been developed which read the information in a film and convert the information to digital signals for storing in a computer. A problem in digitizing film is that the film has regions with high optical density (low transmittance) and regions with low optical density (high transmittance). The regions with high optical density must be measured with great accuracy. This puts extreme requirements on the dynamic range of the system being used to do the digitizing. Dynamic range is defined as the ratio of the largest transmittance signal which can be handled by the system to the noise in transmittance near zero. The dynamic range is limited by the number of electrons which can be held in each detector pixel, by the noise in the detector read out means, and by the resolution of the analog-to-digital (A/D) converter utilized in the system to convert the signal from the detector to digital form. For example, in the scanning of radiographic film, the density range in this type of film is roughly 3.5 (a transmittance range of 1.0 to 0.0003). Also, it is generally felt that a signal-to-noise ratio greater than 15:1 is required at the maximum density. This translates to a dynamic range requirement of 50,000. Such a dynamic range is not possible with most standard detectors.

One approach which has been suggested to provide a large dynamic range is described in the article of R.M. Rangayyen et al. entitled "Expanding the dynamic range of x-ray vidodensitometry using ordinary image digitizing devices", published in APPLIED OPTICS, Vol. 23, No. 18, Sep. 15, 11964, pages 3117–3120. The article teaches reading the image twice, once at high density, and a second time at a lower density. The digital information from the two readings is combined to calculate a resulting image with a wide dynamic range. This article describes carrying out the method using a TV camera tube as the detector. Also, the device is operated in the usual area detector mode, with the film and detector being stationary. This technique suffers from the poor resolution and noise performance of the TV camera tube, and the tendency of the tube to bloom around regions of high transmittance.

Another approach is described in U.S. Pat. No. 5,034,825 (Ejiri et al.), issued Jul. 23, 1991, entitled "High Quality Image Sensor". The method described in this patent, like the method described in the Rangayyan et al. article, reads the image twice, one at a high density and a second time at a low density. The method of this patent has the advantage that it uses a solid state charge-coupled device (CCD) scanner as the detector. However, the method of this patent requires the film to be passed across the detector twice. This slows down the overall process, and there can be registration problems in moving the film across the detector a multiple of times.

It is desirable to be able to relatively rapidly read information on a film with regions of different optical densities and convert the information to an electrical signal.

SUMMARY OF THE INVENTION

The present invention is directed to apparatus and a method of passing film once across a charge-coupled device scanner having a plurality of linear arrays thereon. One of the arrays is responsive to high optical densities and the other array is responsive to low optical densities. The information from the two arrays is then combined and digitized.

The apparatus of the present invention comprises a charge-coupled device image sensor having at least two linear arrays of charge-coupled devices thereon. Means is provided for setting the response of each of the arrays so that one of the arrays is sensitive to high optical densities and the other of the arrays is sensitive to low optical densities. Means is provided for passing the image across the image sensor so that the image passes across all of the arrays in one pass, and means is provided for illuminating the image so that light from the image is directed onto the image sensor.

In the method of the present invention the image is passed in a single pass across at least two linear array charge coupled device sensors. One of the sensors is adjusted to be sensitive to high densities and the other array is adjusted to be sensitive to low densities. An output signal from each of the arrays is converted to digital form and the signals are combined to obtain a single digital signal corresponding to the image.

Viewed from another aspect, the present invention is directed to apparatus for digitizing an image. The apparatus comprises a charge-coupled device image sensor having at least two linear arrays of charge-coupled devices thereon, setting means, passing means, and illumination means. The setting means sets the response of each of the arrays so that one of the arrays is sensitive to a first range of optical densities and the other of the arrays is sensitive to a second range of optical densities which is different from the first range of optical densities. The passing means passes the image across the image scanner so that the image passes across all of the arrays in one pass. The illumination means illuminates the image so that light from the image is directed onto the image sensor.

The invention will be better understood from the following more detailed description taken with the accompanying drawings and claims.

The drawings are not necessarily to scale.

DETAILED DESCRIPTION

Figure 1:
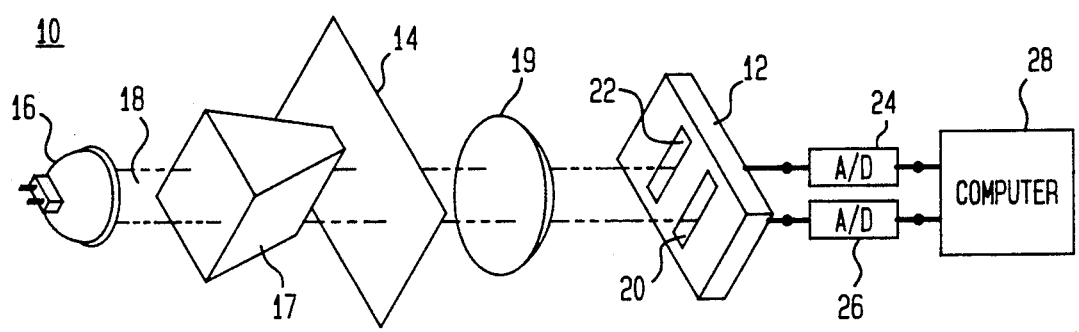
FIG. 1 is a schematic and perspective view of a film digitizer apparatus in accordance with the present invention.

Referring now to FIG. 1, there is shown a schematic and perspective view respectively of film digitizer apparatus 10 in accordance with the present invention. The film digitizer apparatus 10 comprises a charge-couple device (CCD) image sensor 12, a film 14 to be read which is movable across the image sensor 12, and a light source 16 on the side of the film 14 opposite the image sensor 12. The light source 16 is positioned to direct a beam of light 18 through the film and onto the image sensor 12. Between the light source 16 and the film 14 are illumination optics 17. Between the film 14 and the image sensor 12 is a lens 19 which directs the light beam onto the image sensor 12. The light source 16 is positioned to direct a beam of light 18 through the film and onto the image sensor 12. The image sensor comprises a plurality of linear charge coupled devices (CCDs) of which just two, 20 and 22, are shown for illustrative purposes. The CCDs 20 and 22 convert light incident thereon to output analog signals which are coupled to inputs of analog-to-digital (A/D) converters 24 and 26, respectively. The A/D converters 24 and 26 are adapted to convert the analog signals received from CCDs 20 and 22, respectively, to a digital output signal which is coupled to an input of a computer (also denoted as computing means) 28. The computer 28 combines the digital signals from the A/D converters 24 and 26 and generates and single output signal corresponding to the image on the film 14. The computer 28 can then store the signal and/or feed it to a printer or other type of display (both not shown).

Figure 2:
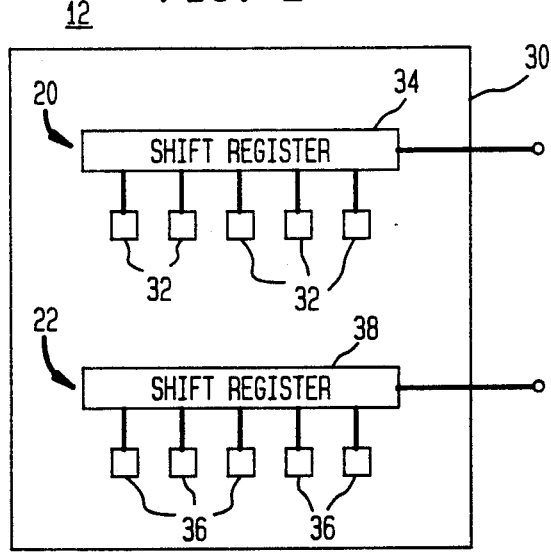
FIG. 2 is a plan schematic view of a CCD image sensor for use in the film digitizer of FIG. 1.

Referring now to FIG. 2, there is shown a front plan view of a typical image sensor 12 which is useful as the image sensor 12 of FIG. 1. The image sensor 12 of FIG. 2 comprises a body 30 of a semiconductor material, such as single crystalline silicon, having the liner CCDs 20 and 22 therein. CCD 20 comprises a plurality of photodetectors 32, such as photodiodes, arranged in spaced relation along a row. Extending along the row of photodetectors 32 is a CCD shift register 34 which is adapted to receive the charges generated in the photodetectors 32 and to transfer the charges to an output (not shown). The photodetectors 32 and CCD shift register 34 may be of any well known construction with means for transferring charge from the photodetectors 32 to the shift register 34. Similarly, the CCD 22 comprises a plurality of photodetectors 36 arranged in spaced relation along a row and a CCD shift register 38 extending along the row of photodetectors 36. The shift register 38 is adapted to receive charges from the photodetectors 36 and transfer the charges to an output (not shown). The CCDs 20 and 22 are provided with antiblooming means, not shown, of any well known type. One type of CCD image sensor which is highly suitable for use in this type of digitizer apparatus 10 is shown and described in a U.S. Patent application, Ser. No. 589,877 (Herbert J. Erhardt), filed Sep. 28, 1990, and entitled "Image Sensor", and having a common assignee with the present application.

The linear array CCDs 20 and 22 are designed to respond to regions of different optical densities (transmittance). For example, the CCD 20 may be designed to respond to low transmittance (high density) and the CCD 22 may be set to respond to high transmittance (low density). The CCD 20 could be used for transmittances within a first range from 0.0 to 0.04, whereas the CCD 22 could be used for transmittances within a second range from 0 to 1. This provides first and second ranges having a ratio of 25:1; however, lower ratios can be used with a ratio of 16:1 being the presently preferred ratio. If the CCD arrays 20 and 22 each had a dynamic range of 4000:1, the low transmittance array 20 would have a noise on a transmittance scale of 0.04/4000=0.00001, whereas the high transmittance array 22 would have a signal-to-noise ratio at transmittance of 0.04 of 0.04×4000=160. This is well above that needed for full image fidelity at that transmittance. If both of these signals are digitized (using 12-bit A/D converters) and the digital signals are combined by computing means such that the first signal is used for low transmittance, and the second signal is used for high transmittances, the effective dynamic range of the system is 1/0.00001=100,000.

In the image sensor 12, antiblooming means in the CCDs 20 and 22 is important. For the array 20 set to low transmittance, those pixels with high transmittance would provide as much as 25 times (1/0.04) more signal than the CCD 20 could hold. In the absence of antiblooming, this excess signal would bleed down the CCD and change the charge stored at pixels with low transmittances. The antiblooming solves this problem by draining off the excess signals.

The image sensor 12 could contain more than two linear CCD arrays with the extra arrays being used in several different manners. For example, a third array could be set to respond to a transmittance between the high and low. This would provide the computer with a middle range (for example, a transmittance range of 0.01 to 0.04) to minimize crossover effects between the high and low range. Alternatively, two or more arrays could be used to sense the same range and the output signals from the two averaged by the computer to provide a single signal at the one range.

Several methods can be used to set the response of the arrays 20 and 22. One method is to make the photodetectors 32 of the CCD array 20 narrower than the photodetectors 36 of the CCD array 22. Another method is to cover the photodetectors 32 of the CCD array 20 with a neutral filter means which absorbs some of the incoming light. A further method is to cover the photodetectors 32 and 36 with a color filter and to provide light in the light source 16 with a spectral distribution such that different arrays receive a different integrated signal. A variation on this last method if to leave one of the arrays bare and cover the other array with a color filter. Still another method is to use an exposure control means on the arrays 20 and 22 to increase the exposure received by one array compared to the other. U.S. Patent application, Ser. No. 589,877 (Herbert J. Erhardt), filed Sep. 28, 1990, and entitled "Image Sensor", and having a common assignee with the present application provides an example of such exposure control means. In this case, all arrays could be devoid of filters and no special shaping of the illumination spectrum would be required.

In the operation of the apparatus 10 of the present invention, the film 14 is passed across the image sensor 12 with the single light beam 18 from the source 16 passing through the film and impinging on the image sensor 12. As the film passes across each of the linear CCD arrays 20 and 22, the portions of the film of one density is read by the array 20 and the portions of the other density is read by the array 22. The signal outputs of the arrays 20 and 22 are fed to their respective A/D converters 24 and 26 which convert the signals from analog to digital form. The digital signals from the A/D converters 24 and 26 are fed to the computer 28 which combines the signals to form a single signal corresponding to the image on the film. The final signal can then be stored in the computer 28 and/or fed to a display. This provides a digitizer 10 having a high dynamic range provided by the use of the solid-state CCD detectors 20 and 22. Also, it is very fast since it requires only a single pass of the film 14 across the image sensor 12. In addition, the single pass of the film across the image sensor 12 eliminates any problem of registration of the film 14 with respect to the image sensor 12. Further, the use of an image sensor 12 having all of the linear CCD arrays 20 and 22 on a single body 30 with antiblooming means built into the arrays 20 and 22 further simplifies the system.

It is to be appreciated and understood that the specific embodiments of the invention are merely illustrative of the general principles of the invention. Various modifications may be made consistent with the principles set forth. For example, various types of CCD constructions can be used with various structures of photodetectors, shift registers and antiblooming means. Still further, the apparatus 10 can be used for reading all types of film or similar objects having an image thereon. Furthermore, although the apparatus 10 is especially useful for reading objects having extreme dynamic range, it can be used to read objects which do not have such extreme dynamic ranges.

What is claimed is:

1. Apparatus for digitizing an image comprising:
    a charge-coupled device image sensor comprising a body of a semiconductor material and at least two linear arrays of a charge-coupled devices on the body;
    means for setting the response of each of the arrays so that each of the arrays is sensitive to a different optical density and with one of the arrays being sensitive to a lower optical density than the other array;
    means for passing the image across the image sensor so that the image passes across all of the arrays in one pass; and
    means for illuminating the image so that light from the image is directed onto the image sensor.

2. The apparatus of claim 1 in which each of the linear arrays of charge-coupled devices comprises a row of spaced photodetectors, a charge-coupled shift register extending along the row of photodetectors, and means for transferring charge from the photodetectors to the shift register.

3. The apparatus of claim 2 in which each of the arrays of charge-coupled devices further comprises antiblooming means for the photodetectors.

4. The apparatus of claim 2 in which the means for setting the response of the arrays comprises having the photodetectors of one of the arrays narrower in the cross-scan direction than the photodetectors of the other array.

5. The apparatus of claim 2 in which the means for setting the response of the arrays comprises neutral filter means on the photodetectors of one of the arrays.

6. The apparatus of claim 2 in which the means for setting the response of the arrays comprises separate color filters over the photodetectors of each array, and the means for illuminating the image provides a light with a spectral distribution such that different arrays receive different integrated signals.

7. The apparatus of claim 2 in which the means for setting the response of the arrays comprises a color filter over the photodetectors of one of the arrays.

8. The apparatus of claim 2 in which the means for setting the response of the arrays comprises control means on the image sensor to increase the integrated exposure received by one of the arrays compared to that received by the other array.

9. The apparatus of claim 1 in which the image sensor comprises at least three linear arrays of charge-coupled devices, and the means for setting the response of the arrays sets the third array so that it is sensitive to an optical density between the densities of the other two arrays.

10. The apparatus of claim 1 further comprising:
    the image sensor comprises at least three linear arrays of charge-coupled devices;
    the means for setting the response of the arrays sets two of the arrays to be sensitive to one optical density level and the third array to a different optical density level; and
    computing means to which outputs of the arrays are coupled for averaging output signals from the two arrays and combining the average signal to an output signal of the third array to achieve a signal corresponding to the image.

11. The apparatus of claim 1 further comprising a computer for receiving the signals from the arrays, and a separate analog-to-digital converter between each array and the computer to convert the signal from the array to a digital signal which is fed to the computer.

12. A method of digitizing an image comprising the steps of:
    passing the image in a single pass once across a body of a semiconductor material having at least two linear arrays of a charge-coupled device sensor on the body;
    adjusting the sensor so that each of the arrays is sensitive to a different optical density and with one of the arrays being sensitive to a lower optical density than that of the other array;
    converting an output signal from each of the arrays to a digital signal; and
    combining the digital signals to obtain a single signal corresponding to the image.

13. The method of claim 12 further comprising the step of directing a beam of light from the image onto the linear arrays.

14. The method of claim 13 further comprising the step of forming each of the arrays of a plurality of photodetectors arranged in a row and a charge-coupled device shift register extending along the row of photodetectors.

15. The method of claim 14 in which the arrays are adjusted to be sensitive to different optical densities by making the photodetectors of one array narrower in the cross-scan direction than the photodetectors of the other array.

16. The method of claim 14 in which the arrays are adjusted to be sensitive to different optical densities by covering the photodetectors of one of the arrays with a neutral filter.

17. The method of claim 14 in which the arrays are adjusted to be sensitive to different optical densities by covering the photodetectors of the arrays with color filters and providing the beam of light with a spectral distribution such that different arrays receive different integrated signal.

18. The method of claim 14 in which the arrays are adjusted to be sensitive to different optical densities by covering the photodetectors of only one of the arrays with a color filter.

19. The method of claim 14 in which the arrays are adjusted to be sensitive to different optical densities by providing exposure control means for the arrays and adjusting the control means to increase the integrated exposure received by one array compared with that received by the other array.

20. The method of claim 11 in which there are at least three linear arrays, and adjusting the sensitivity of the third array so that it is sensitive to a level of optical density between that of the other two arrays.

21. The method of claim 11 in which there are at least three linear arrays, and comprising the step of adjusting the arrays so that two of the arrays are sensitive to one level of the optical density and the third array is sensitive to another level of optical density, averaging the signals from the two arrays and combining the averaged signal with the signal from the third array to obtain a single signal corresponding to the image.

22. Apparatus for digitizing an image comprising:
a charge-coupled device image sensor having at least two linear arrays of charge-coupled devices on a single body of a semiconductor material;
means for setting the response of each of the arrays so that one of the arrays is sensitive to a first range of optical densities and the other of the arrays is sensitive to a second range of optical densities which is different from the first range of optical densities;
means for passing the image across the image sensor so that the image passes across all of the arrays in one pass; and
means for illuminating the image so that light from the image is directed onto the image sensor.

* * * * *